(12) United States Patent
Tamura

(10) Patent No.: US 6,951,399 B2
(45) Date of Patent: Oct. 4, 2005

(54) METER UNIT

(75) Inventor: Satoru Tamura, Anjo (JP)

(73) Assignee: Denso Corporation, Kariya (JP)

( * ) Notice: Subject to any disclaimer, the term of this patent is extended or adjusted under 35 U.S.C. 154(b) by 111 days.

(21) Appl. No.: 10/425,942

(22) Filed: Apr. 30, 2003

(65) Prior Publication Data

US 2003/0210538 A1 Nov. 13, 2003

(30) Foreign Application Priority Data

May 10, 2002 (JP) ........................................ 2002-135855

(51) Int. Cl.⁷ .............................. G01D 11/28; H03J 1/00
(52) U.S. Cl. ........................... 362/23; 362/27; 362/464; 116/250
(58) Field of Search ............................. 362/27–29, 464, 362/489, 23; 116/48, 286, 250; 315/77; 340/438, 815.78

(56) References Cited

U.S. PATENT DOCUMENTS

| 6,168,280 B1 * | 1/2001 | Ozawa ........................ 362/23 |
| 6,210,011 B1 * | 4/2001 | Ikeuchi et al. ................ 362/26 |
| 6,302,551 B1 * | 10/2001 | Matumoto ..................... 362/27 |
| 6,422,710 B1 * | 7/2002 | Herzog et al. ................ 362/23 |
| 6,714,126 B2 * | 3/2004 | Wada .......................... 340/438 |

FOREIGN PATENT DOCUMENTS

| JP | A-H06-201410 | 7/1994 |
| JP | A-10-115533 | 5/1998 |

* cited by examiner

Primary Examiner—Sandra O'Shea
Assistant Examiner—Ali Alavi
(74) Attorney, Agent, or Firm—Posz & Bethards, PLC

(57) ABSTRACT

A meter unit includes pointer light sources, main mark light sources, and sub-mark light sources. The pointer light sources, the main mark light source, and the sub-mark light sources are turned on with time lags after an ignition (IG) switch is turned to an ON position. Therefore, pointers, main marks, sub-marks of the meter unit are illuminated with time lags. This makes outlines of the pointers, the main marks, and the sub-marks sharp. As a result, not only the pointers but also the marks and the sub-marks of the meter unit outstand from each other.

19 Claims, 7 Drawing Sheets

METER UNIT

CROSS REFERENCE TO RELATED APPLICATION

This application is based on and incorporates herein by reference Japanese Patent Application No. 2002-135855 filed on May 10, 2002.

FIELD OF THE INVENTION

The present invention relates to a meter unit having a pointer, scale marks, and characters that look standout from each other.

BACKGROUND OF THE INVENTION

A meter unit in which pointers turn and points to scale marks on dial parts is disclosed in JP-A-6-201410. In this unit, the pointers are illuminated when a key switch is turned on, and the marks and characters on the dial parts are illuminated a certain period after the pointers are illuminated. This makes outlines of the pointers sharp and the pointers look standout from the marks and the characters. However, the marks and the characters do not look standout from each other.

SUMMARY OF THE INVENTION

The present invention therefore has an objective to provide a meter unit in which not only the pointers but also scale marks and characters on dial parts of the meter unit look standout from each other when illuminated. To achieve the objective, the present invention includes first, second, and third light sources, and a switching device. The first, the second, and the third light sources illuminate the pointers, the marks, and the characters, respectively. The switching device is provided to make or to release a connection between the light sources and a power source. When the switching device is turned on, power is supplied to each light source with time lags.

When the switching device is turned on, the pointers, the marks, and the characters are illuminated with time lags. This makes outlines of the pointers, the marks, and the characters sharp. Therefore, not only the pointers but also the marks and the characters look standout from each other when illuminated. Because the one that is illuminated earlier look more standout than others, it is preferable that the one needs to look standout the most is illuminated first. Then, the second most is illuminated second, and the least is illuminated the last. For instance, if the first light sources are supplied with power first, the pointers become more standout than the marks and the characters.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

Figure 1:
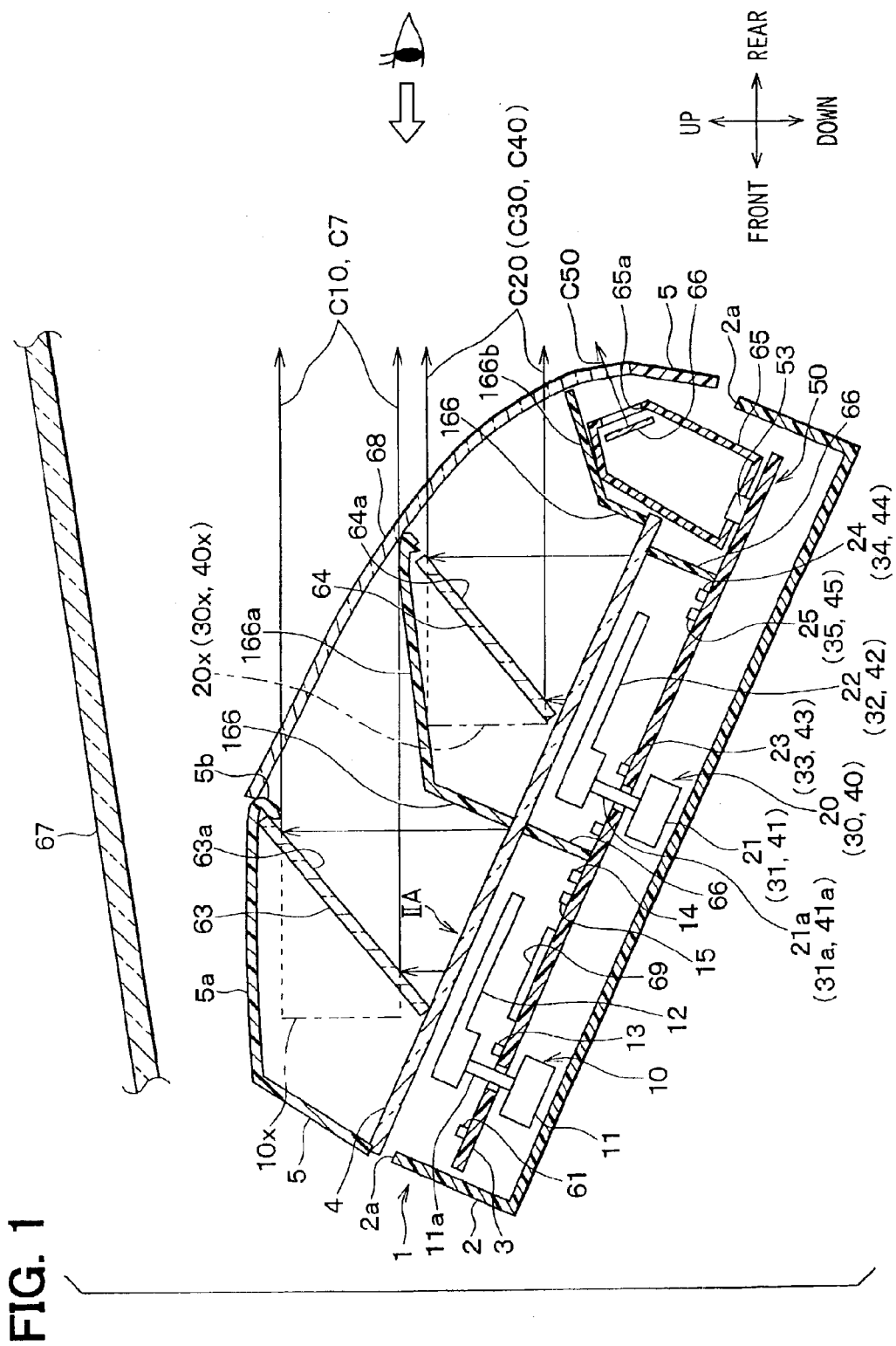
FIG. 1 is a cross-sectional view of a meter unit according to the first embodiment of the present invention.

The preferred embodiment of the present invention will be explained with reference to the accompanying drawings. In the drawings, the same numerals are used for the same components and devices.

Figure 2A:
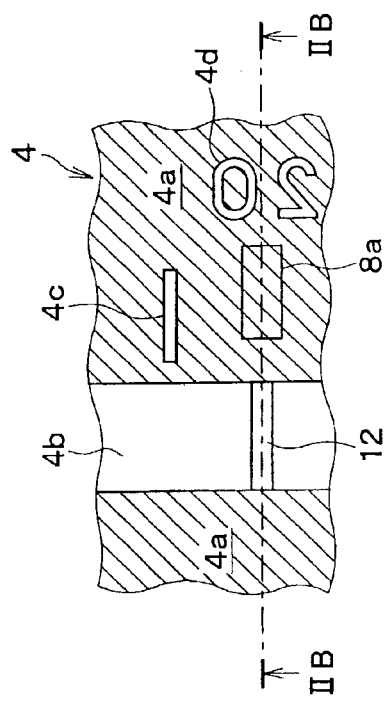
FIG. 2A is a plane view of a speedometer included in the meter unit viewed in the direction indicated by an arrow A in FIG. 1.
Figure 2B:
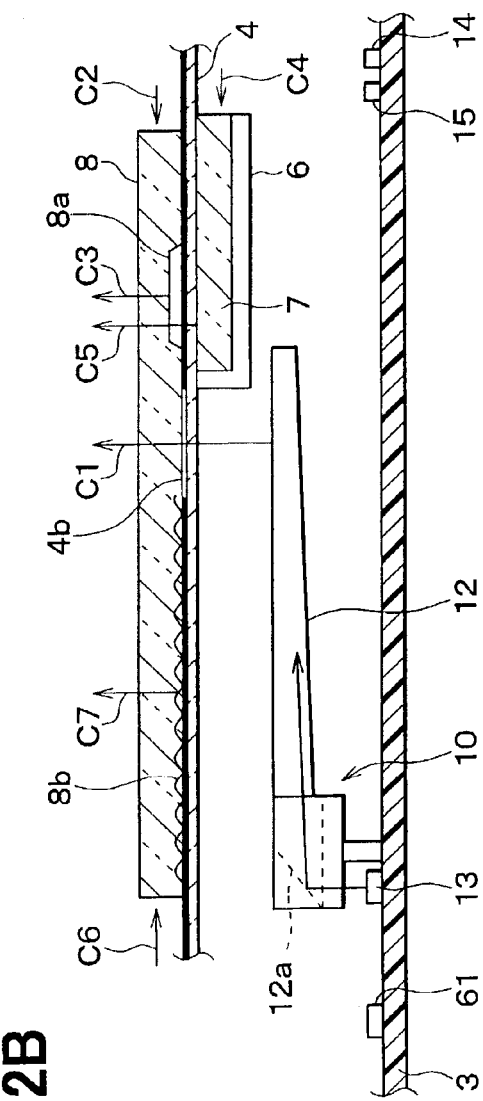
FIG. 2B is a cross-sectional view of the speedometer sectioned by a line IIB—IIB in FIG. 2A.
Figure 3:
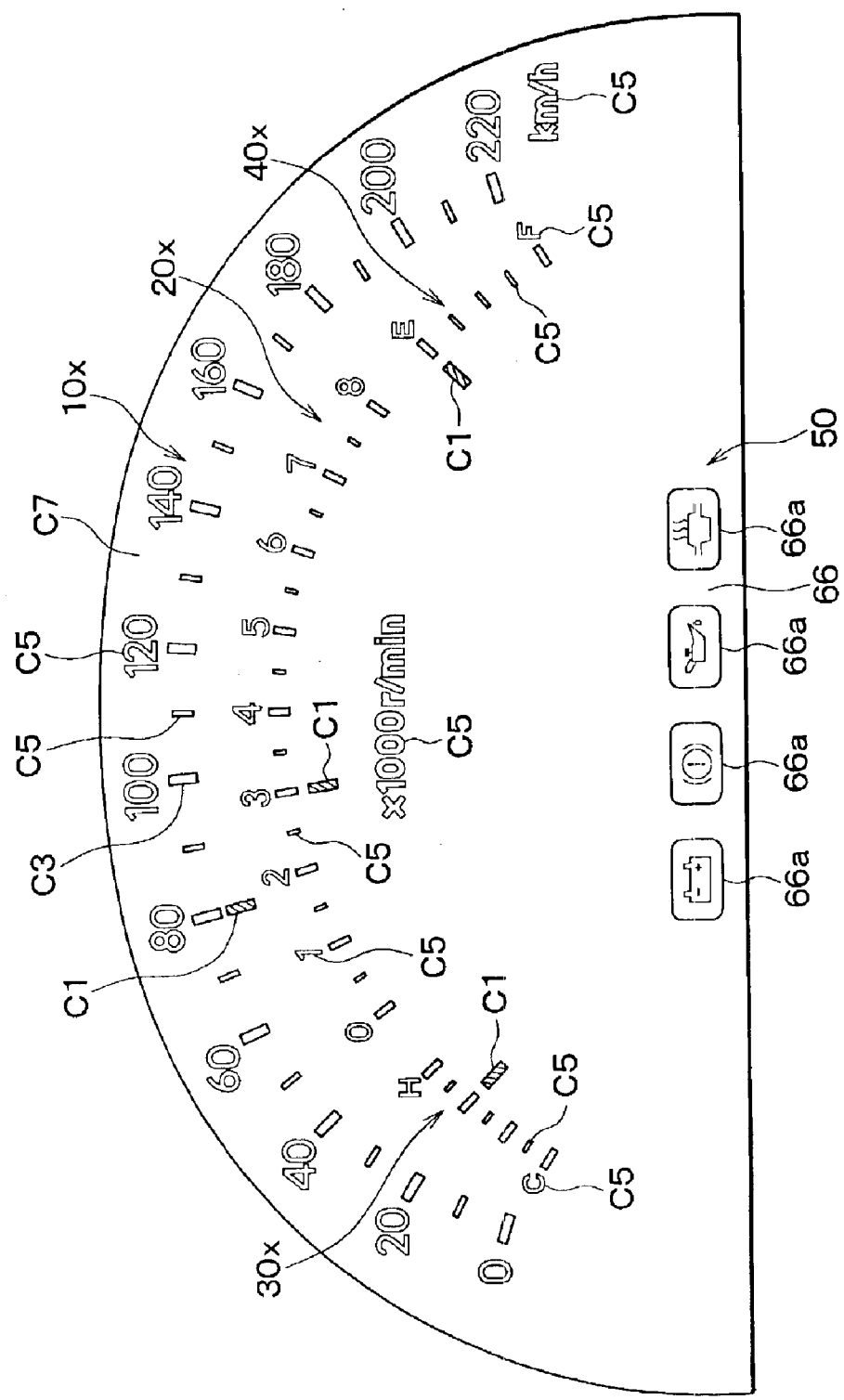
FIG. 3 is a front image of the speedometer.

Referring to FIGS. 1 to 3, a meter unit of the present invention is applied to a vehicular meter unit installed in an instrument panel located in a front portion of a vehicle. The meter unit 1 includes a speedometer 10, a tachometer 20, a coolant temperature gauge 30 (not shown), a fuel gauge 40 (not shown), and warning indicators 50.

The speedometer 10 and the tachometer 20 display the speed of the vehicle and engine revolutions per minutes (RPM), respectively. The coolant temperature gauge 30 and the fuel gauge 40 displays the temperature of the engine coolant and the amount of fuel remaining in a tank (fuel level), respectively. The warning indicators 50 indicate warnings for abnormal conditions of speed, RPM, coolant temperature, and fuel level. The temperature gauge 30 and the fuel gauge 40 are arranged horizontally in line with the tachometer 20 and have the same structure as the tachometer 20.

The meter unit 1 has a lower case 2 having a substantially U-shaped cross-section. The lower case 2 houses a printed circuit board (PCB) 3 and turning mechanisms 11, 21, 31, 41. Rotary shafts 11a, 21a, 31a, 41a of the turning mechanisms 11, 21, 31, 41 have a speedometer pointer 12, a tachometer pointer 22, a temperature gauge pointer 32, and a fuel gauge pointer 42, respectively. The pointers 12, 22, 32, 42 turn according to turning movements of the turning mechanisms 11, 21, 31, 41.

A dial 4 is arranged substantially in parallel to the PCB 2 on the other side of the pointers 12, 22, 32, 42. A hood 5 is attached to the lower case 2 around its opening 2a. The dial 4 is held between the lower case 2 and a hood 5. The lower case 2 and the hood 5 are made of a light blocking material for reducing light in the meter unit 1 to emit to the outside.

The dial 4 is a light guiding member made of a resin, such as a polycarbonate resin. A surface of the dial 4 is treated by black printing to block light except for portions including pointer windows 4b, sub scale marks 4c, characters 4d and a red zoon (both not shown) as shown in FIG. 2A. A surface of the dial 4 in the red zoon is treated by translucent red printing. The pointer windows 4b are provided along an arc so that a base of the arc lies in the horizontal direction of the vehicle as shown in FIG. 3. Parts of the pointers 12, 22, 32, 42 are seeable through the pointer windows 4b.

The PCB 3 includes: speedometer pointer, main mark, sub-mark light sources 13, 14, 15, tachometer pointer, main mark, sub-mark light sources 23, 24, 25, coolant temperature gauge pointer, main mark, sub-mark light sources 33, 34, 35, fuel gauge pointer light sources 43, 44, 45, indicator light sources 53, and a background light source 61. The light sources 13 and 14 are for illuminating the pointer 12 and main scale marks 8a, respectively. The pointer light sources 13, 23, 33, 43, the main mark light sources 14, 24, 34, 44, the sub-mark light sources 15, 25, 35, 45, and the background light source 61 correspond to the first, the second, the third, and the fourth light sources, respectively. Light emitting diodes (LED) may be used for the first, the second, and the third light sources.

FIGS. 2A and 2B show different view of the speedometer 10. The tachometer 20, the temperature gauge 30, and the fuel gauge 40 have the same configurations as the speedometer 10. Therefore, they are not explained in detail. The dial 4 includes a black printed surface 4a, a pointer window 4b, supplemental scale marks (sub-marks) 4c, and characters 4d. The characters 4d are arranged so that the main marks 8a are properly labeled and scale levels are indicated.

A light guiding member 7 for the sub-marks and characters is attached to the dial 4 surfaces adjacent to the pointer 12 and held by a holding member 6 in the lower case 2. A light guiding member 8 for the main marks 8a is attached to the other surface of the dial 4. A back surface of the light guiding member 7 is treated by white printing. The main marks 8a of the speedometer 10 are provided by forming wells 8a on the back surface of the light guiding member 8. The main marks 8a and the sub-marks 4c are alternately arranged along the pointer windows 4b.

When the first light source 13 is turned on, light emitted from it is guided by the light guiding members 12a to a tip of the pointer 12. Then, the light emerges from the surfaces of the pointer 12 as a pointer light C1. The light then passes through the pointer window 4b and the light guiding member 8, and emerges as indicating light for lighting the pointer 12.

When the light sources 14 is turned on, light C2 emitted from it is guided by a light guiding member (not shown) and enters into the light guiding member 8. The light is reflected at the well 8a and emerges from the surface of the light guiding member 8 as indicating light as indicated with an arrow C3.

When the light source 15 is turned on, light emitted from is guided by a light guiding member (not shown) and enters into the light guiding member 7 as indicated with an arrow C4. The light passes through the sub-marks, the characters 4d, and the light guiding member 8. Then, it emerges as indicating light as indicated with an arrow C5.

When the light source 61 is turned on, light emitted from it is guided by a light guiding member (not shown) and enters into the light guiding member 8 as indicated with an arrow C6. The light is reflected at a grain-patterned surface 8b and emerges as indicating light as indicated with an arrow C7.

On the surface of the light guiding member 8, the first light reflector 63 and the second light reflector 64 both made of a translucent material are provided. The first reflector 63 is positioned further from a driver than the second reflector 64. The speedometer 10 is arranged behind the second reflector 64, that is, it is positioned further from the driver than the second reflector 64.

In FIG. 1, light C10 is emitted from the speedometer 10 and backlight C7 reflect off a reflector surface 63a of the first light reflector 63 toward the driver. As a result, the driver sees a virtual image of the speedometer display indicated with a dashed line 10x. The tachometer 20, the temperature gauge 30, and the fuel gauge 40 also have main marks 8a and sub-marks 4c similar to the main marks 8a and the sub-marks 4c on the speedometer 10. The operations of the meters 20, 30, 40 are also similar to the speedometer 10.

Light C20 emitted from the tachometer 20, light C30 emitted from the temperature gauge 30, and light C40 emitted from the fuel gauge 40 reflect off a reflector surface 64a of the second reflector 64 toward the driver. As a result, the driver sees virtual images of the tachometer 20, the temperature gauge 30, and the fuel gauge 40 indicated with dashed lines 20x, 30x, and 40x, respectively.

The virtual images 10x, 20x, 30x, and 40x are divided into two groups: the first group includes the virtual image 10x and the second group includes the virtual images 20x, 30x, and 40x. The first group is formed in an arc shape that stretches in a horizontal direction of the vehicle. The second group is formed in an arc shape lined up in a horizontal direction of the vehicle along and below the first group. The second group looks closer to the driver than the first group since the first reflector 63 is positioned behind the second reflector 64. As a result, a three-dimensional effect is created.

The grain surface 8b of the light guiding member 8 is formed so that the brightness of the backlight C7 gradually decreases toward the bottom of the dial 4. In other words, the grain surface 8b gradually becomes fine toward the bottom of the dial 4. This creates gradations. The reflectors 63, 64 are concavely curved so that the images created by the lights C7, C10, C20, C30, C40 are enlarged in a horizontal direction of the vehicle by the reflectors 63a, 64a.

The light sources 53 for the indicators 50 are covered by a light shielding cover 65. An indicator panel 66 is housed in the cover 65. The surface of the indicator panel 66 is treated by light shield black printing except for portions including icons 66a. The light sources 53 are lined up in the horizontal direction of the vehicle corresponding to the icons 66a. When the light sources 53 are turned on, the light emitted from the light sources 53 pass through the respective icons as indicated with an arrow C50. The driver can see the lighted icons 66a through the opening 65a of the cover 65.

Light shielding dividing members 166 are provided for dividing space defined by the lower case 2 and the hood 5. The light C10 and the light C7 pass through the first compartment. The light C20, the light C30, and the light C40 pass through the second compartment. The light C50 passes through the third compartment.

A portion 166a of the dividing member 166 blocks the light from the tachometer 20, the temperature gauge 30, and the fuel gauge 40 traveling toward a front windshield 67 of the vehicle. A portion 166b of the dividing member 166 blocks the light C50 from the indicators 50 traveling toward the front windshield 67. In other words, the portions 166a and 166b reduces the images of the meter unit 1 reflected on the front windshield 67.

Likewise, a portion 5a of the hood 5 located between the speedometer 10 and the front windshield 67 functions as a reflection reduction member 5a for blocking the light C10, C7. The hood 5 has an opening 5b that is covered with a translucent cover 68. The smoky translucent cover 68 reduces the brightness of the light C7, C10, C20, C30, C40, C50 at a transmittance rate lower than a predetermined rate. The first reflector 63, the second reflector 64, and the reflection reduction members 5a, 166a are covered with the cover 68. This reduces images of those parts 63, 64, 5a, 166a of the meter unit 1 overlapping the virtual images 10x, 20x, 30x, 40x. In other words, the cover 68 blocks the parts 63, 64, 5a, 166a from the driver's view to increase the visibility of the virtual images 10x–40x.

The hood 5 and the cover 68 form a continuous surface and this makes the virtual images 10x–40x seen around the opening 5b, the actual image 50c, and the hood 5 look in one piece.

Figure 4:
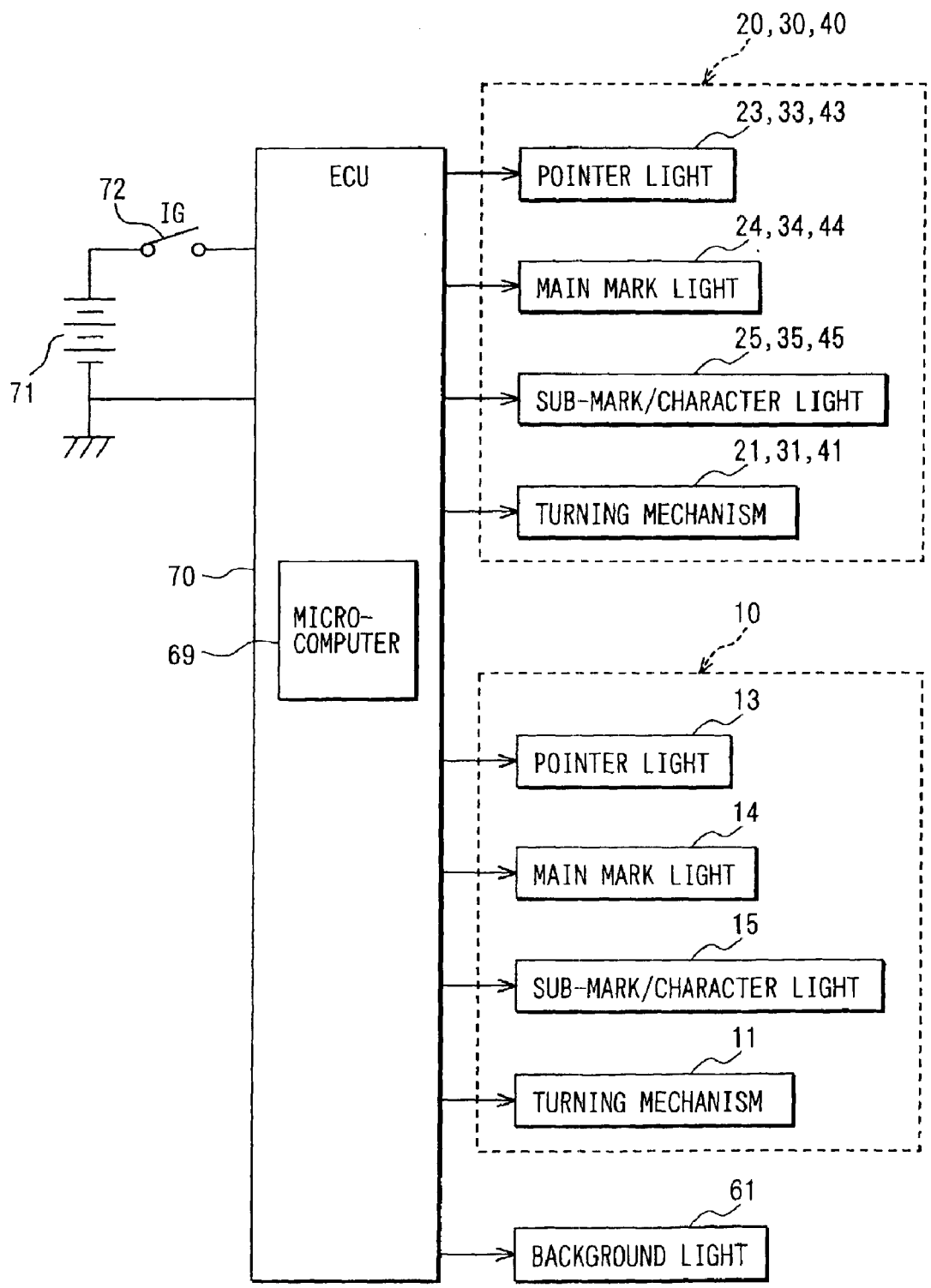
FIG. 4 is a block diagram of an electrical circuit including a meter ECU shown in FIG. 1.

As in FIGS. 1 and 4, a microcomputer 69 is mounted on the PCB 3. An electronic control unit (a meter ECU) 70 that includes the microcomputer 69 is supplied with power from an onboard battery 71 via an ignition switch (IG switch) 72. When the IG switch 72 is turned to a start position, which is a position to allow an engine ignition, the power is supplied to the meter ECU 70. This position is referred to as an IG ON position and other positions are referred to as IG OFF positions.

When the IG switch 72 is turned to the IG ON position and the power is supplied to the meter ECU 70, the light sources 13–15, 23–25, 33–35, 43–45, 53, 61, and the turning mechanisms 11, 21, 31, 41 are controlled by the meter ECU 70. The microcomputer 69 performs a meter unit illumination process. The speedometer 10, the tachometer 20, the temperature gauge 30, and the fuel gauge 40 are divided into two display groups based on an illumination sequence. The first display group includes the speedometer 10, and the second display group includes the tachometer 20, the temperature gauge 30, and the fuel gauge 40.

Figure 5:
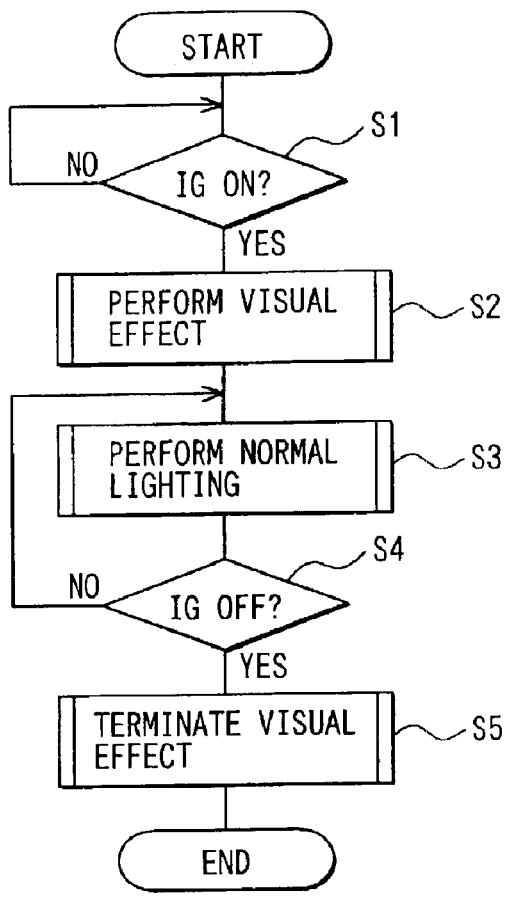
FIG. 5 is a flowchart showing a main program of a microcomputer included in the meter ECU.

As shown in FIG. 5, it is determined whether the IG switch 72 is at the IG ON position (S1). If yes, a subroutine program (S21, S22) are called and executed to perform a visual effect procedure (S2). The visual effect procedure includes illuminating the speedometer 10, the tachometer 20, the temperature gauge 30, and the fuel gauge 40 with time lags. It also includes turning on the pointer light sources 13, 23, 33, 43, the main mark light sources 14, 24, 34, 44, and the sub-mark light sources 15, 25, 35, 45 are illuminated with time lags.

When the subroutine program is completed, a normal lighting procedure is performed (S3). The normal lighting procedure includes driving the turning mechanisms 11, 21, 31, 41 so that the pointers 12, 22, 32, 42 point main marks 8a or sub-marks 4c corresponding to predetermined physical values. In the cases that abnormal condition occurs, the light sources 53 are turned on to illuminate respective icons 66a. The normal lighting procedure is preformed until it is determined that the IG switch 72 is turned to the OFF position (S4).

When it is determined that the IG switch 72 is turned to the OFF position, a subroutine program (S51–S57) for terminating the visual effect procedure. The subroutine program includes steps of turning off the illumination of the speedometer 10, the tachometer 20, the temperature gauge 30, and the fuel gauge 40 with time lags. It also includes steps of turning off the pointer light sources 13, 23, 33, 43, the main mark light sources 14, 24, 34, 44, and the sub-mark light sources 15, 25, 35, 45 with time lags.

Figure 6:
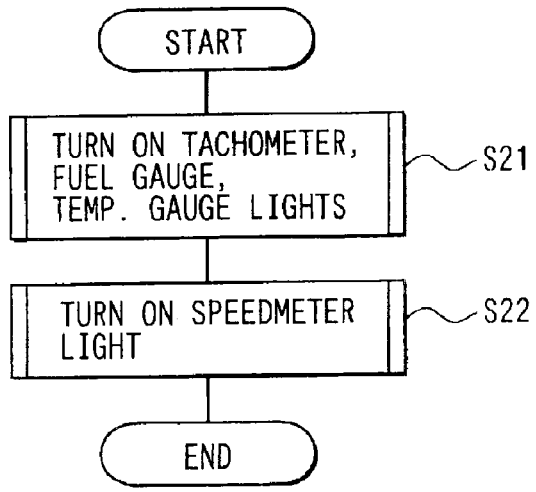
FIG. 6 is a flowchart showing a subroutine program called in step 2 of the main program shown in FIG. 5.

Referring to FIG. 6, the subroutine program (S21, S22) includes another subroutine program (S211–S219) for illuminating the second group. The subroutine program (S211–S219) will be discussed more in detail later. When the subroutine program (S211–S219) the first group is illuminated (S22). The pointer 12, the marks 8a, and the characters 4d are illuminated with time lags.

Figure 7:
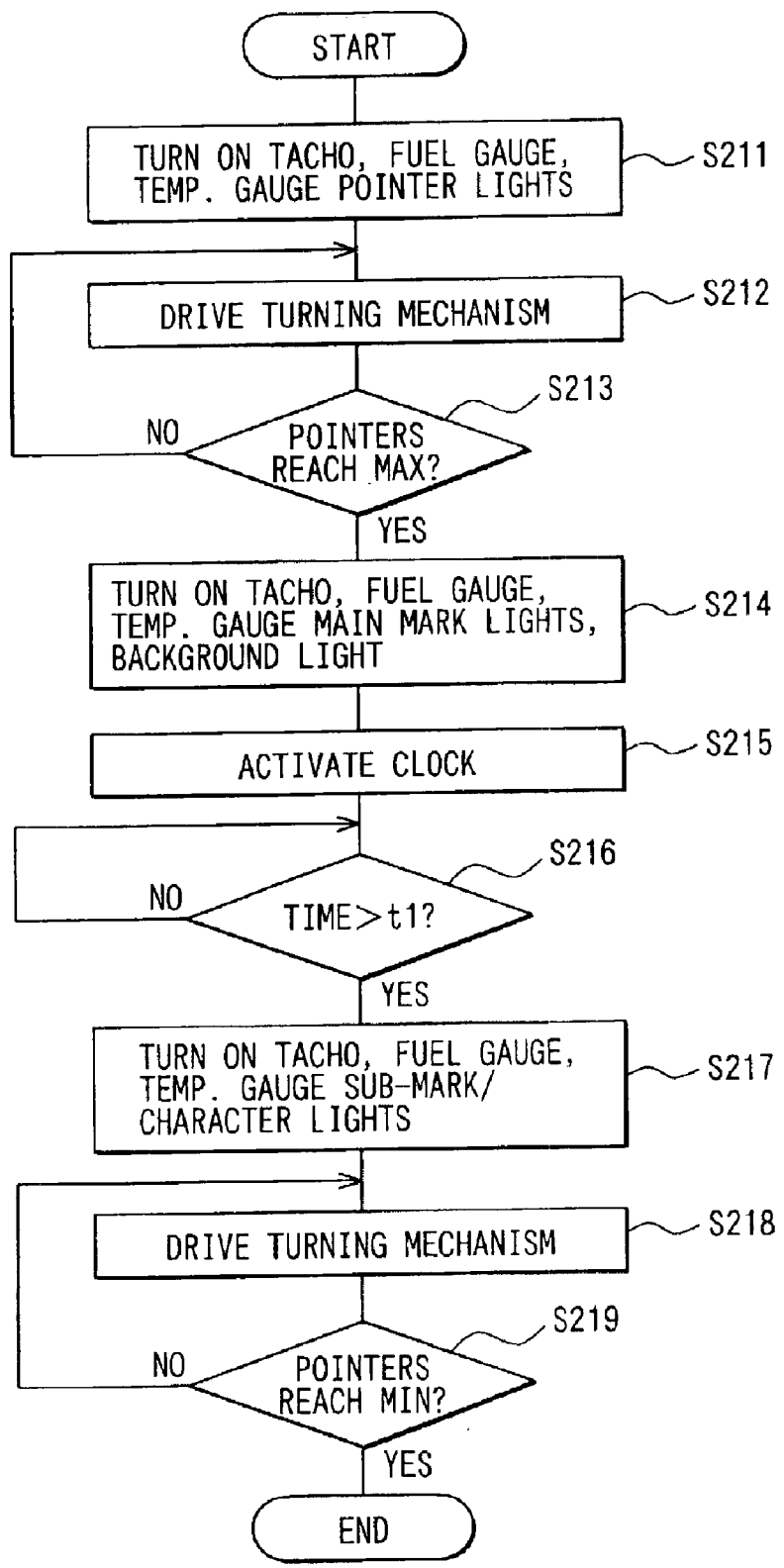
FIG. 7 is a flowchart showing a subroutine program called in step S21 of the subroutine program shown in FIG. 6.

The subroutine program (S211–S219) is shown in FIG. 7. The pointer light sources 23, 33, 43 are turned on to illuminate the tachometer 20, the temperature gauge 30, and the fuel gauge 40 (S211). The turning mechanisms 21, 31, 41 is driven so that the pointers 22, 32, 42 are tuned toward the maximum marks of the main marks 8a or sub-marks 4c (S212).

It is determined whether the pointers 22, 32, 42 reach the maximum marks (S213). If yes, the main mark light source 24, 34, 44 are turned on to illuminate the main marks 8a (S214). The main marks 8a are illuminated when a predetermined time period has passed after the pointers 22, 32, 42 are illuminated. The predetermined time period is a period between the time when the pointers 22, 32, 42 are illuminated and the time when the pointers 22, 32, 42 reach the maximum marks.

A clock is activated after the illumination of the main marks 8a is completed (S215). It is determined whether the time exceeds a predetermined time t1 (S216). If yes, the sub-mark light sources 25, 35, 45 are turned on to illuminate the sub-marks 4c and the characters 4d (S217). Then, the turning mechanisms 21, 31, 41 are driven so that the pointers 22, 32, 42 are tuned toward the maximum marks of the main marks 8a or the sub-marks 4c (S218). It is determined whether the pointers 22, 32, 42 reach the maximum marks (S219). If yes, the subroutine program is completed and the next step (S22) is performed.

The speedometer 10 is illuminated when a predetermined time period has passed after the sub-marks 4c and the characters 4d are illuminated. The predetermined time period is a period between the time when the sub-marks 4c and the characters 4d are illuminated and the time when the pointers 22, 32, 42 reach the minimum marks. The pointer 12, the main marks 8a, and the characters 4d are illuminated with time lags and the pointer 12 is turned to the maximum mark, and then turned to the minimum mark. The main mark light source 14 and the background light source 61 are simultaneously turned on so that the main marks 8a and the grain surface 8b are simultaneously illuminated.

Figure 8:
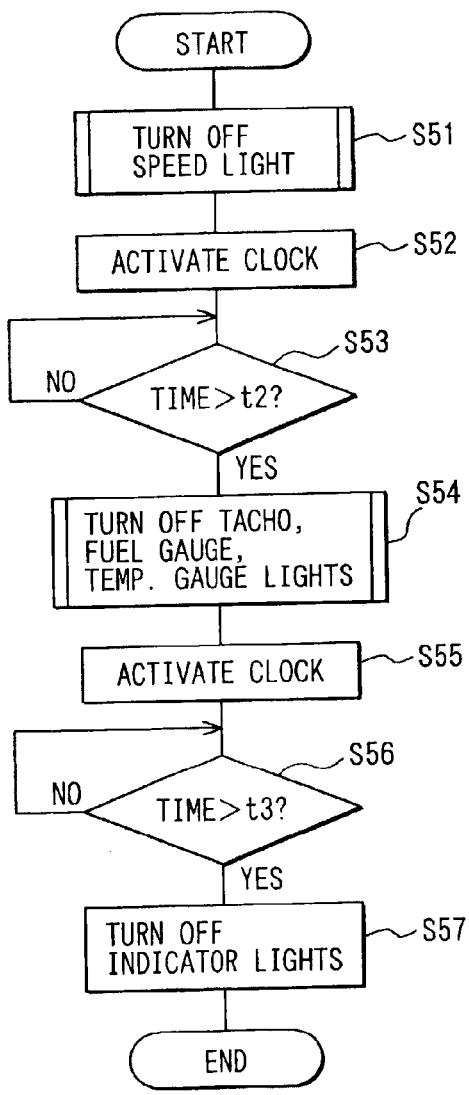
FIG. 8 is a flowchart showing a subroutine program called in step S5 of the main program shown in FIG. 5.

A subroutine program for terminating the visual effect procedure is shown in FIG. 8. The illumination of the first group is turned off (S51). The illumination of the pointer 12, the main marks 8a, and the characters 4d are turned off with time lags. Then, a clock is activated (S52). It is determined whether the time exceeds a predetermine time period t2 (S53). If yes, the illumination of the tachometer 20, the temperature gauge 30, and the fuel gauge 40 are turned off (S54). The illumination of the speedometer 10, the tachometer 20, the temperature gauge 30, and the fuel gauge 40 are turned off with time lags. After this step is completed, a clock is activated (S55). It is determined whether the time exceeds a predetermined time period t3 (S56). If yes, the illumination of the indicators 50 is turned off (S57).

Figure 9:
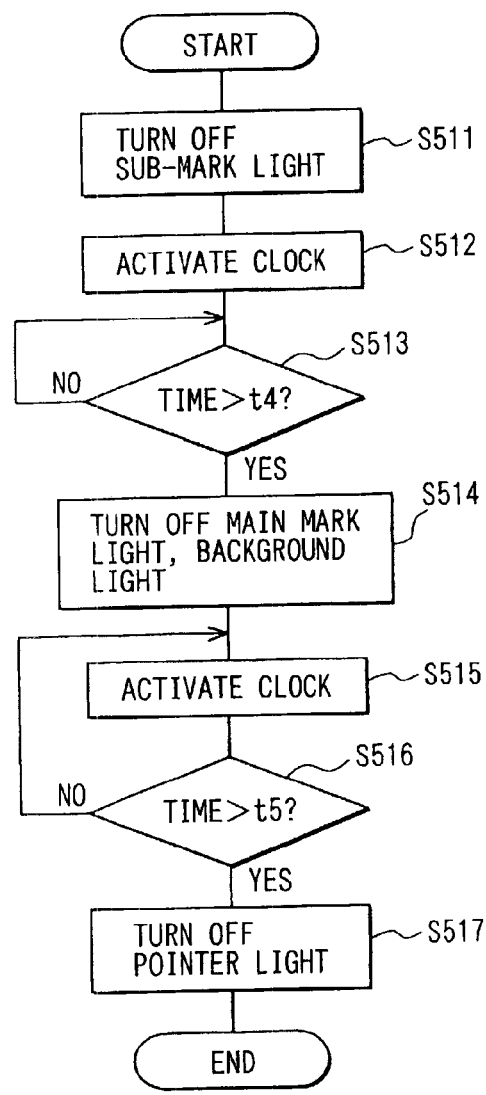
FIG. 9 is a flowchart showing a subroutine program called in step S51 of the subroutine program shown in FIG. 8.

Referring to FIG. 9, the sub-mark light source 15 is turned off so that the illumination of the sub-marks 4c and characters 4d are turned off (S511). Then, a clock is activated (S512). It is determined whether the time exceeds a predetermined time period t4 (S513). If yes, the main mark light source 14 is turned off so that the illumination of the main marks 8a is turned off (S514). The illumination of the main marks 8a is turned off when the predetermined time t4 has passed after the illumination of the sub-marks 4c and the characters 4d is turned off.

The background light source 61 is turned off at the same time when the main mark light source is turned off (S514). In other words, the backlight is turned off at the same time when the illumination of the main marks turned off. Then, a clock is activated (S515). It is determined whether the time exceeds a predetermined time period t5 (S516). If yes, the pointer light source 13 is turned off so that the illumination of the pointer 12 is turned off (S517). In other words, the illumination of the pointer 12 is turned off when the predetermined time period has passed after the illumination of the main marks 8a is turned off.

If an IG ON signal comes in during the step (S5) of terminating the visual effect procedure, the IG ON signal is ignored and the step (S5) is completed. If the IG OFF signal comes in during the step (S2) of performing the visual effect procedure, the step (S2) is terminated. Then, the step (S5) of terminating the visual effect procedure is performed according to the IG OFF signal.

When the IG switch is turned to the ON position, the pointers 12, 22, 32, 42, the main marks 8a, sub-marks 8c, and the characters 4d are illuminated with time lags. Therefore, outlines of the pointers 12, 22, 32, 42, main marks 8a, sub-marks 8c, and the characters 4d look sharp. In other words, not only the pointers 12, 22, 32, 42 but also the main marks 8a and the characters 4d look standout from each other.

The pointer light sources 13, 23, 33, 43 are turned on and the pointers 12, 22, 32, 42 are turned toward the maximum marks of the main marks 8a after the IG is turned on. When the pointers 12, 22, 32, 42 reach the maximum marks, the main mark light sources 14, 24, 34, 44 are simultaneously turned on. The pointers 12, 22, 32, 42 turn toward the minimum marks after they reach the maximum marks. At the same time when the pointers 12, 22, 32, 42 reach the minimum marks, the sub-mark light sources 15, 25, 35, 45 are turned on. This improves the visibility of the meter unit 1.

Furthermore, the speedometer 10, the tachometer 20, the temperature gauge 30, and the fuel gauge 40 are illuminated with time lags. Therefore, the visibility of the meter unit 1 is even more improved. When the IG switch is turned to the OFF position, the illumination of the pointers 12, 22, 32, 42, the main marks 8a, the sub-marks 4c, and the characters 4d are turned off with time lags. This makes the meter unit 1 have a distinguished-looking. Additionally, the illumination of the speedometer 10, the tachometer 20, the temperature gauge 30, and the fuel gauge 40 is turned off with time lags. Thus, the meter unit 1 look distinguished even more.

The meter unit 1 includes the first reflector 63 and the second reflector 64 arranged a certain distance away from each other in the front-rear direction of the vehicle. Therefore, the virtual images 10x, 20x, 30x, 40x can be adjusted in size without altering the size of the reflectors 63, 64. This creates a three-dimensional effect without enlarging the meter unit 1 in the vertical direction.

The speedometer 10 is installed in a space behind the second reflector 64. This reduces an increase in size of the meter unit 1. Because the reflectors 63, 64 have concaved surfaces 63a, 64a, the light emitted from the devices 10, 20, 30, and 40 are enlarged after reflecting off the concaved surface 63a, 64a. Therefore, the virtual images 10x, 20x, 30x, 40x can be enlarged without increasing the sizes of the devices 10, 20, 30, and 40 and the reflectors 63, 64.

The present invention should not be limited to the embodiment previously discussed and shown in the figures, but may be implemented in various ways without departing from the spirit of the invention. For example, LCD displays can be used for displaying the pointers 12, 22, 32, 42, the main marks 8a, the sub-marks 4c, and the characters 4d. The visual effect procedure may be performed for any one of the first and the second group of the virtual images 10x, 20x, 30x, and 40x. The virtual images 10x, 20x, 30x, and 40x may be divided into three groups that are displayed at different levels in the vertical direction. In this case, the visual effect procedure may be performed for each group, or at least one of the three groups.

The meter unit 1 can be applied to a meter unit for watercraft, aircraft, or any vehicle other than a passenger vehicle. An electricity on-off switch may be used instead of the IG switch 72 for an electric vehicle.

What is claimed is:

1. A meter unit having a pointer, scale marks, and characters, the pointer pointing the scale marks and characters representing scale levels, comprising:

a first light source that illuminates the pointer;

a second light source that illuminates the scale marks;

a third light source that illuminates the characters for the marks; and a switching means that connects the first, the second, and the third light sources with a power source; and a control means for turning on the first light source when the switching means is closed, turning on the second light source after the first light source is turned on, and turning on the third light source after the second light source is turned on.

2. The meter unit according to claim 1, wherein:

the second light source includes a main mark light source and a sub-mark light source; and the control means controls the first, the second, and the third light sources for turning on the main mark light source after the first light source is turned on and simultaneously turning on the third light source and the sub-mark light source after the main mark light source is turned on.

3. The meter unit according to claim 2, wherein:

the pointer turns toward a maximum mark of the scale marks when the first light source is turned on; and the control means is configured to facilitate turning on the main mark light source when the pointer reaches the maximum mark.

4. The meter unit according to claim 3, wherein:

the pointer turns toward a minimum mark of the scale marks when the main mark light source is turned on; and the third light source and the sub-mark light source are simultaneously turned on when the pointer reaches the minimum mark.

5. The meter unit according to claim 1, further comprising:

a background member that forms a background for the pointer, the scale marks, and the characters; and a fourth light source that illuminates the background member, wherein the fourth light source is turned on at the same time when the main mark light source is turned on.

6. A meter unit having a pointer, scale marks, and characters on a dial, the pointer pointing the scale marks and characters representing scale levels, comprising:

a first light source that illuminates the pointer;

a second light source that illuminates the scale marks;

a third light source that illuminates the characters; and a switching means that connects the first, the second, and the third light sources with a power source, wherein the control means is configured to facilitate turning off the third light source when the switching means is opened, turning off the second light source after the third light source is turned off, and turning off the first light source after the second light source is turned off.

7. The meter unit according to claim 6, wherein:

the second light source includes a main mark light source and a sub-mark light source; and the control means is programmed for simultaneously turning off the third light source and the sub-mark light source, turning off the main mark light source after the third light source and the sub-mark light source are turned off, and turning off the first light source after the main mark light source is turned off.

8. The meter unit according to claim 6, further comprising:
a background member that is a background for the pointer, the scale marks, and the characters; and
a fourth light source that illuminates the background member, wherein
the fourth light source is turned off at the same time when the main mark light source is turned off.

9. The meter unit according to claim 1, wherein the first, the second, and third light sources are light-emitting diodes.

10. The meter unit according to claim 1, wherein the switching means is a switch for starting up a vehicle.

11. A meter unit having a pointer, scale marks, and characters, the pointer pointing the scale marks and characters representing scale levels, comprising:
a first light source that illuminates the pointer;
a second light source that illuminates the scale marks;
a third light source that illuminates the characters for the marks;
a switching means that connects the first, the second, and the third light sources with a power source; and
a control means having a means for controlling illumination of the first, the second, and the third light sources and a means for turning the pointer, wherein
the second light source includes a main mark light source and a sub-mark light source for illuminating main marks and sub-marks of the scale marks, respectively,
the pointer turning means turns the pointer toward a maximum mark of the scale marks when the first light source is turned on,
the illumination controlling means turns on the first light source when the switching means is closed and the main mark light source when the pointer reaches the maximum mark, and
the illumination controlling means further turns on the third light source and the sub-mark light source simultaneously after the main mark light source is turned on.

12. The meter unit according to claim 11, wherein:
the pointer turning means turns the pointer toward a minimum mark of the scale marks when the main mark light source is turned on; and
the illumination controlling means simultaneously turns on the third light source and the sub-mark light source when the pointer reaches the minimum mark.

13. The meter unit according to claim 11, wherein the control means is further configured to facilitate turning off the third light source when the switching means is opened, the second light source after the third light source is turned off, and the first light source after the second light source is turned off.

14. The meter unit according to claim 11, wherein:
the control means is programmed for simultaneously turning off the third light source and the sub-mark light source, turning off the main mark light source after the third light source and the sub-mark light source are turned off, and turning of the first light source after the main mark light source is turned off.

15. The meter unit according to claim 11, further comprising:
a background member that is a background for the pointer, the scale marks, and the characters; and
a fourth light source that illuminates the background member wherein
the fourth light source is turned on at the same time when the main mark light source is turned on.

16. The meter unit according to claim 11, wherein the first, the second, and the third light sources are light-emitting diodes.

17. The meter unit according to claim 11, wherein the switching means is a switch for starting up a vehicle.

18. The meter unit according to claim 1, wherein the control means is further configured to facilitate turning off the third light source when the switching means is opened, the second light source after the third light source is turned off, and the first light source after the second light source is turned off.

19. The meter unit according to claim 18, wherein the second light source includes a main mark light source and a sub-mark light source; and
the control means is programmed for simultaneously turning off the third light source and the sub-mark light source, turning off the main mark light source after the third light source and the sub-mark light source are turned off, and turning off the first light source after the main mark light source is turned off.

* * * * *